United States Patent
Won et al.

(10) Patent No.: US 11,945,303 B1
(45) Date of Patent: Apr. 2, 2024

(54) METHOD OF CONTROLLING DISCONNECTOR FOR VEHICLE

(71) Applicants: Hyundai Motor Company, Seoul (KR); Kia Corporation, Seoul (KR)

(72) Inventors: Chan Hee Won, Seoul (KR); Tae Wook Park, Incheon (KR); Young Joon Chang, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/116,460

(22) Filed: Mar. 2, 2023

(30) Foreign Application Priority Data

Sep. 15, 2022 (KR) .................. 10-2022-0116489

(51) Int. Cl.
*B60K 23/08* (2006.01)
*B60K 28/16* (2006.01)

(52) U.S. Cl.
CPC .............. *B60K 23/08* (2013.01); *B60K 28/16* (2013.01); *B60K 2023/085* (2013.01)

(58) Field of Classification Search
CPC .............. B60K 23/08; B60K 2023/085; B60K 2023/0858; B60K 28/16
See application file for complete search history.

(56) References Cited

U.S. PATENT DOCUMENTS

| 4,854,413 | A | 8/1989 | Kameda et al. |
| 6,853,901 | B2* | 2/2005 | Doh ................... B60K 23/0808 |
| | | | 192/3.56 |
| 2009/0076696 | A1* | 3/2009 | Perkins ................ B60W 10/10 |
| | | | 477/79 |
| 2017/0182885 | A1* | 6/2017 | Suzuki ................. B60K 17/165 |
| 2017/0253242 | A1* | 9/2017 | Fukada ............... F02N 11/0833 |
| 2018/0345787 | A1* | 12/2018 | Niimi ...................... F16D 13/52 |

FOREIGN PATENT DOCUMENTS

| JP | 8-91088 A | 4/1996 |
| KR | 10-2013-0128170 A | 11/2013 |
| KR | 10-1787261 B1 | 10/2017 |
| KR | 10-2017-0135041 A | 12/2017 |
| KR | 10-2251702 B1 | 5/2021 |
| KR | 10-2339680 B1 | 12/2021 |
| KR | 10-2022-0068371 A | 5/2022 |

\* cited by examiner

*Primary Examiner* — Edwin A Young
(74) *Attorney, Agent, or Firm* — Morgan, Lewis & Bockius LLP

(57) ABSTRACT

A method includes switching a vehicle to a 4WD state by connecting a disconnector, maintaining the disconnector in the connected state for a predetermined maintenance time, determining whether a condition to be switched to a 2WD state is satisfied when the predetermined maintenance time period elapses, and disconnecting the disconnector when the condition to be switched to the 2WD state is satisfied.

20 Claims, 2 Drawing Sheets

METHOD OF CONTROLLING DISCONNECTOR FOR VEHICLE

CROSS REFERENCE TO RELATED APPLICATION

The present application claims priority to Korean Patent Application No. 10-2022-0116489 filed on Sep. 15, 2022, the entire contents of which is incorporated herein for all purposes by this reference.

BACKGROUND OF THE PRESENT DISCLOSURE

Field of the Present Disclosure

The present disclosure relates to a technology of controlling a disconnector for a vehicle.

Description of Related Art

In electric vehicles capable of four-wheel drive, a disconnector actuator system (DAS) is mounted on sub-drive wheels to improve fuel efficiency so that a motor and a reducer may be separated from the sub-drive wheels in a section in which a required torque of the vehicle is not large, such as a coasting traveling section.

In many cases, the disconnector actuator system (hereinafter simply referred to as a "disconnector") is configured to switch a vehicle to a state in which the motor and the reducer are connected to the sub-drive wheels and a state in which the motor and the reducer are separated from the sub-drive wheels using a dog clutch to maximize power transmission efficiency.

In the instant case, to apply power to the sub-drive wheels by coupling the disconnector, a series of processes of coupling the disconnector after synchronizing the revolutions per minute (RPM) of the motor and the reducer to the sub-drive wheels is essential.

Accordingly, when the disconnector is connected or disconnected too frequently while the vehicle is traveling, an impact and a sense of traveling difference may occur in the vehicle.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method of controlling a disconnector for a vehicle, which can ultimately improve the drivability of the vehicle by preventing an impact or a sense of traveling difference from occurring in the vehicle even while accommodating the request for connection and separation of a disconnector as much as possible in a situation in which the request for connection and separation of the disconnector consecutively occurs due to a change in a driving condition of the vehicle or a road surface situation.

A method of controlling a disconnector for a vehicle for achieving the object includes switching the vehicle to a 4WD state by connecting the disconnector, maintaining the disconnector in the connected state for a predetermined maintenance time, determining whether a condition to be switched to a 2WD state is satisfied when the predetermined maintenance time period elapses, and disconnecting the disconnector when the condition to be switched to the 2WD state is satisfied.

The switching of the vehicle to the 4WD state by connecting the disconnector may be performed after determining whether a condition to be switched from the 2WD state to the 4WD state is satisfied, and synchronizing of the disconnector when the condition to be switched to the 4WD state is satisfied.

The method may further include determining whether the condition to be switched to the 2WD state is satisfied while the synchronizing of the disconnector is performed, the switching of the vehicle to the 4WD state by connecting the disconnector when the condition to be switched to the 2WD state is not satisfied while the synchronizing of the disconnector is performed is performed.

The disconnecting of the disconnector when the condition to be switched to the 2WD state is satisfied while the synchronizing of the disconnector is performed may be performed.

The method may further include determining whether the vehicle satisfies the condition to be switched to the 2WD state before the synchronizing of the disconnector is ended after it starts, when the condition to be switched to the 2WD state is satisfied, the vehicle returns to the 2WD state by ending the switching to the 4WD state and disconnecting the disconnector.

The condition to be switched from the 2WD state to the 4WD state may include at least one combination of a driving mode selection of a driver, the amount of operation of an accelerator pedal, a lateral acceleration of the vehicle, and a wheel slip.

The condition to be switched from the 2WD state to the 4WD state may be determined as being satisfied when the amount of operation of the accelerator pedal is greater than or equal to a predetermined reference operation amount.

The condition to be switched from the 2WD state to the 4WD state may be determined as being satisfied when the lateral acceleration of the vehicle is greater than or equal to a predetermined reference lateral acceleration.

The condition to be switched from the 2WD state to the 4WD state may be determined as being satisfied when the wheel slip of at least one of four wheels of the vehicle is greater than or equal to a predetermined reference wheel slip.

The condition to be switched from the 2WD state to the 4WD state may be determined as being satisfied when the vehicle posture control of a vehicle posture control device including an electronic stability control (ESC) or a traction control system (TCS) is performed.

Furthermore, a method of controlling a disconnector for a vehicle includes determining whether a condition to be switched from a 2WD state to a 4WD state is satisfied, synchronizing the disconnector when the condition to be switched to the 4WD state is satisfied, determining whether a condition to be switched to the 2WD state is satisfied while the synchronizing of the disconnector is performed, and switching the vehicle to the 2WD state by stopping the switching to the 4WD state and disconnecting the disconnector when the condition to be switched to the 2WD state is satisfied.

The condition to be switched from the 2WD state to the 4WD state may be determined as being satisfied when a driver selects a 4WD mode, a power mode, or a sports mode, the amount of operation of an accelerator pedal is greater than or equal to a predetermined reference operation amount, a lateral acceleration of the vehicle is greater than or equal to a predetermined reference lateral acceleration, a wheel slip of at least one of four wheels of the vehicle is greater than or equal to a predetermined reference wheel slip, or an operation of a vehicle posture control device including an electronic stability control (ESC) or a traction control system (TCS) is performed.

The condition to be switched to the 2WD state may be determined as being satisfied when the controller concludes that all items for determining the condition to be switched from the 2WD state to the 4WD state are not satisfied.

Maintaining the 4WD state by completing the connection of the disconnector and then maintaining the disconnector in the connected state for a predetermined maintenance time period when the condition to be switched to the 2WD state is not satisfied while the synchronizing of the disconnector is performed may be performed.

The determining of whether the condition to be switched to the 2WD state is satisfied after the predetermined maintenance time period has elapsed may be performed, and according to a result of the determining, the disconnector may be disconnected or the connected state of the disconnector may be maintained.

According to an exemplary embodiment of the present disclosure, it is possible to ultimately improve the drivability of the vehicle by preventing the impact or the sense of difference in traveling from occurring in the vehicle even while accommodating the request for connection and separation of the disconnector as much as possible when the request for connection and separation of the disconnector consecutively occurs due to the change in the driving condition of the vehicle or the road surface situation.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
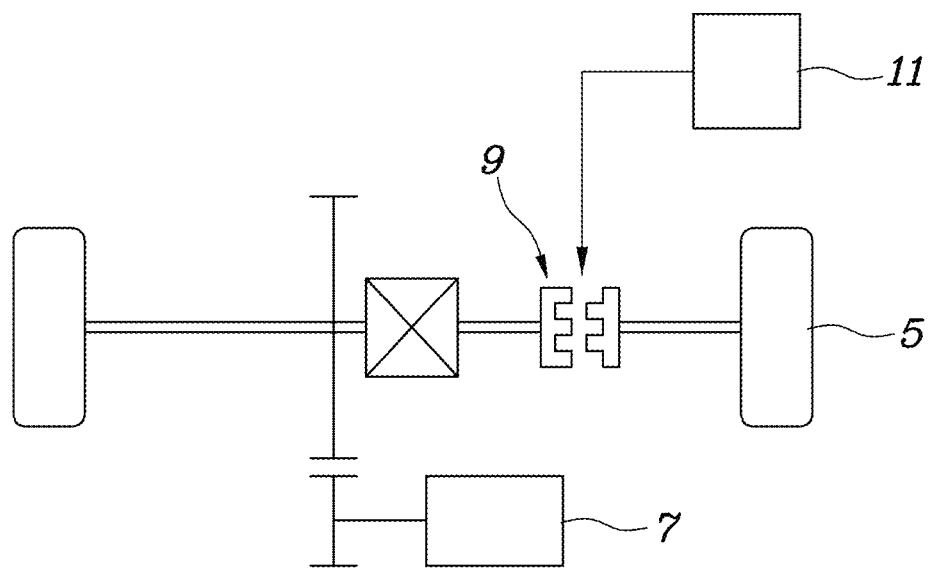
FIG. 1 is a view showing a powertrain apparatus of an electric vehicle to which the present disclosure is applicable.
Figure 1:
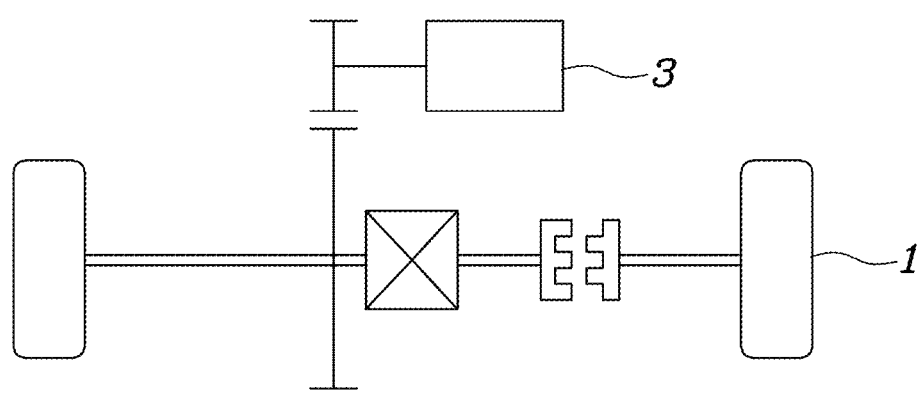

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION OF THE PRESENT DISCLOSURE

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, an exemplary embodiment included in the present specification will be described in detail with reference to the accompanying drawings, and the same or similar components are provided the same reference numerals regardless of reference numerals, and overlapping descriptions thereof will be omitted.

The suffixes "module" and "unit" for components used in the following description are provided or used interchangeably in consideration of only the ease of preparing the specification, and do not have distinct meanings or roles by themselves.

In describing the exemplary embodiment included in the present specification, when it is determined that detailed descriptions of related known technologies may obscure the gist of the exemplary embodiment included in the present specification, detailed descriptions thereof will be omitted. Furthermore, it may be understood that the accompanying drawings are only for easy understanding of the exemplary embodiment included in the present specification, and the technical spirit included herein is not limited by the accompanying drawings, and includes all changes, equivalents, or substitutes included in the spirit and technical scope of the present disclosure.

Terms including ordinal numbers such as first and second may be used to describe various components, but the components are not limited by the terms. The terms are used only for distinguishing one component from another.

When a certain component is referred to as being "connected" or "joined" to another component, it should be understood that it may also be directly connected or joined to another component, but other components may be present therebetween. On the other hand, it should be understood that when a certain component is referred to as being "directly connected" or "directly joined" to another component, other components are not present therebetween.

The singular expression includes the plural expression unless the context clearly dictates otherwise.

In the present specification, it should be understood that terms such as "comprises" or "have" are intended to specify that the features, numbers, steps, operations, components, parts, or combinations thereof described in the specification are present, but do not preclude the possibility of the presence or addition of one or more other features, numbers, steps, operations, components, parts, or combinations thereof in advance.

FIG. 1 schematically shows a powertrain apparatus of an electric vehicle including a disconnector to which the present disclosure is applicable, and a rear wheel 1, which is a main drive wheel, is configured to receive a driving force of a rear motor 3 through a reducer and a differential, and a front wheel 5, which is a sub-drive wheel, is configured to receive a driving force of a front motor 7 through the reducer and the differential, and a disconnector 9 is provided on a driveshaft connecting the differential and the sub-drive wheel.

As shown, the disconnector 9 is configured to connect or release the front motor 7 and the reducer to or from the sub-drive wheel by a dog clutch mechanism, and a controller 11 is provided to control the disconnector 9 by receiving a traveling state of the vehicle and a driver's operation.

The control method according to an exemplary embodiment of the present disclosure may be performed by the controller 11 configured to control the disconnector 9.

Figure 2:
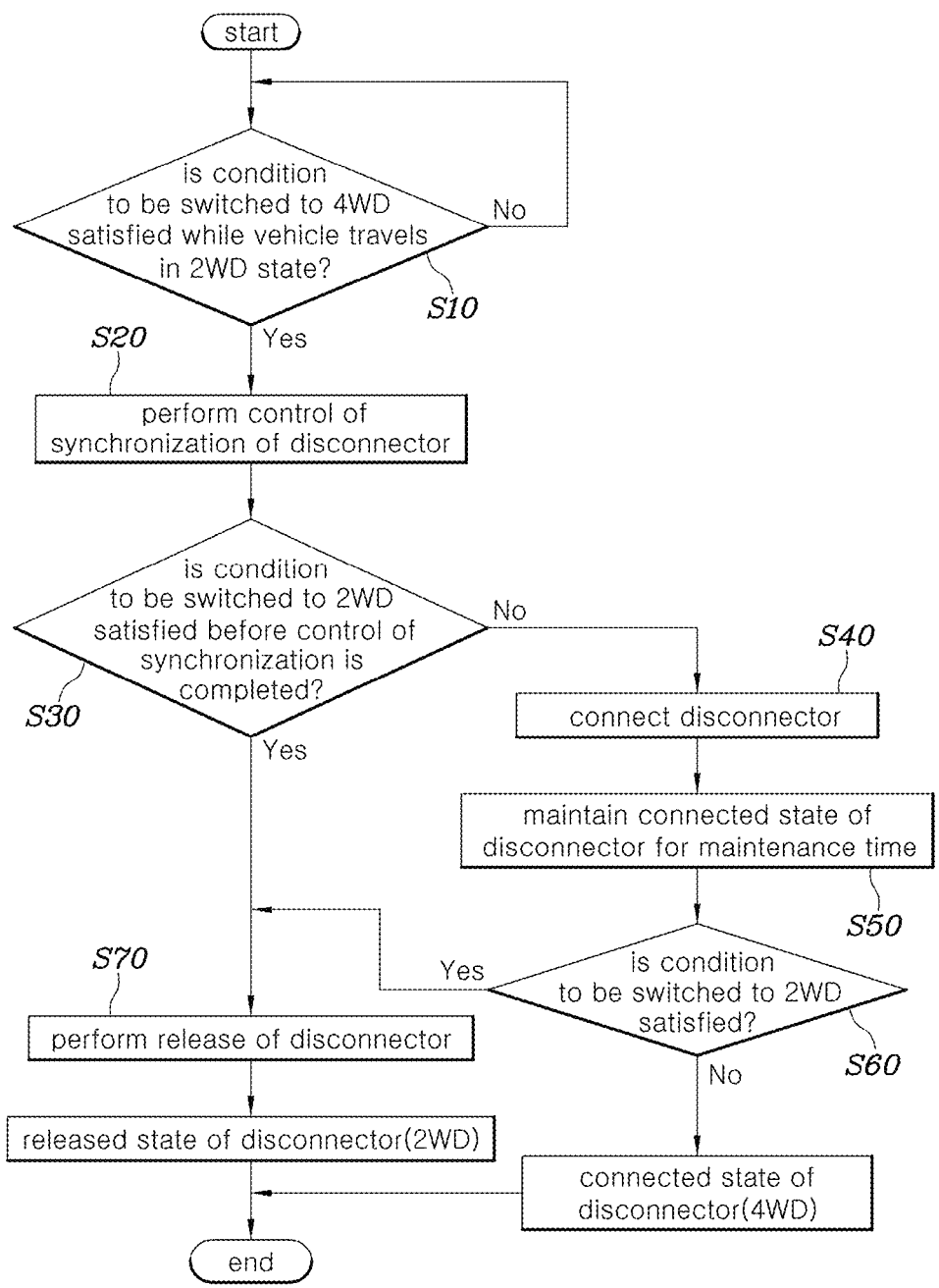
FIG. 2 is a flowchart showing an exemplary embodiment of a method of controlling a disconnector for a vehicle according to an exemplary embodiment of the present disclosure.

Referring to FIG. 2, the method of controlling the disconnector 9 for the vehicle according to an exemplary embodiment of the present disclosure includes an operation of switching the vehicle to a 4 wheel drive (4WD) state by connecting the disconnector 9 (S40), an operation of maintaining the disconnector 9 in the connected state for a predetermined maintenance time period (S50), an operation of determining whether a condition to be switched to a 2 wheel drive (2WD) state is satisfied when the predetermined maintenance time period elapses (S60), and an operation of disconnecting the disconnector 9 when the condition to be switched to the 2WD state is satisfied (S70).

In other words, according to an exemplary embodiment of the present disclosure, when the vehicle is switched to the 4WD state, the vehicle first maintains the 4WD state for the predetermined maintenance time period even when the traveling state of the vehicle is a situation to be switched to the 2WD state, and after the predetermined maintenance time period has elapsed, the vehicle is switched to the 2WD state by disconnecting the disconnector 9 only when the condition to be switched to the 2WD state is satisfied.

This is to prevent the vehicle from returning to the 2WD state for the predetermined maintenance time period once the vehicle is switched from the 2WD state to the 4WD state, so that it is possible to prevent an impact or a sense of traveling difference from occurring in the vehicle by avoiding the excessively frequent switching between the 2WD state and the 4WD state.

Accordingly, in accordance with the above-described purpose, the predetermined maintenance time period is set by design by a number of experiments and analyses to a time of a degree at which a sense of traveling and drivability of the vehicle may not be affected by limiting the excessive switching between the 2WD state and the 4WD state even while improving the travelability of the vehicle by accommodating the request for connection and release of the disconnector 9 according to a change in a driving condition of the vehicle or a road surface situation as much as possible.

In the exemplary embodiment of the present disclosure, the operation of switching the vehicle to the 4WD state by connecting the disconnector 9 (S40) is performed after an operation of determining whether the vehicle satisfies the condition to be switched from the 2WD state to the 4WD state (S10) and an operation of synchronizing the disconnector 9 when the condition to be switched to the 4WD state is satisfied (S20).

Furthermore, the exemplary embodiment further includes an operation of determining whether the vehicle satisfies the condition to be switched to the 2WD state (S30) while the operation of synchronizing the disconnector (9) is performed (S20).

Here, when the condition to be switched to the 2WD state is not satisfied while the operation of synchronizing the disconnector 9 (S20) is performed, the operation of switching the vehicle to the 4WD state by connecting the disconnector 9 is performed (S40) as described above.

Of course, the operation of disconnecting the disconnector 9 when the condition to be switched to the 2WD state is satisfied while the operation of synchronizing the disconnector 9 (S20) is performed (S70) is performed.

In other words, the operation of determining whether the vehicle satisfies the condition to be switched to the 2WD state (S30) before the operation of synchronizing the disconnector 9 (S20) is ended after starting is further performed, and when the condition to be switched to the 2WD state is satisfied, the vehicle returns to the 2WD state by ending the switching to the 4WD in the middle and disconnecting the disconnector 9.

Accordingly, in the instant case, it is possible to prevent the frequent switching between the 2WD state and the 4WD state by immediately returning the vehicle to the 2WD state without ending the switching to the 4WD state, which has already become unnecessary.

For reference, the operation of synchronizing the disconnector 9 means synchronizing velocities of the motor and the reducer, which have been in the state of being disconnected from the sub-drive wheel before connecting the disconnector 9, with a velocity of the sub-drive wheel, and the disconnector 9 may be connected only when the synchronization is performed.

Here, the condition to be switched from the 2WD state to the 4WD state may include a combination of at least one of a driving mode selection of a driver, the amount of operation of an accelerator pedal, a lateral acceleration of the vehicle, and a wheel slip.

For example, the condition to be switched from the 2WD state to the 4WD state may be determined as being satisfied when the amount of operation of the accelerator pedal is greater than or equal to a predetermined reference operation amount.

Here, the reference operation amount is set to a level at which it may be determined that the driver requires a relatively large amount of driving force of the vehicle, and may be determined by design through a number of experiments and analyses.

Furthermore, the condition to be switched from the 2WD state to the 4WD state may be determined as being satisfied when the lateral acceleration of the vehicle is greater than or equal to a predetermined reference lateral acceleration.

Because this is to improve the turning stability of the vehicle by switching the vehicle to the 4WD state when it is determined that the vehicle is in a situation of turning relatively rapidly upon turning, the reference lateral acceleration may be appropriately set by design through a number of experiments and analyses in consideration of the lateral acceleration of a level at which it may be determined that the vehicle is more advantageous in the 4WD state in terms of securing the turning stability of the vehicle.

Furthermore, the condition to be switched from the 2WD state to the 4WD state may be determined as being satisfied when the wheel slip of at least one of four wheels of the vehicle is greater than or equal to a predetermined reference wheel slip.

For example, since it is possible to secure the traveling performance of the vehicle in which the vehicle is more advantageous in the 4WD state than in the 2WD state when the wheel slip of the vehicle wheel is excessive, such as on a slippery road or an unpaved road, the wheel slip of a level at which the road condition may be confirmed may be set to the reference wheel slip.

Furthermore, the condition to be switched from the 2WD state to the 4WD state may be determined as being satisfied when an operation of a vehicle posture control device such as an electronic stability control (ESC) or a traction control system (TCS) is performed.

The present disclosure may also be referred to as follows.

In other words, the method of controlling the disconnector 9 for the vehicle according to the exemplary embodiment of the present disclosure includes the operation of determining whether the condition to be switched from the 2WD state to the 4WD state is satisfied (S10), the operation of synchronizing the disconnector 9 when the condition to be switched to the 4WD state is satisfied (S20), the operation of determining whether the condition to be switched to the 2WD state is satisfied while the operation of synchronizing the disconnector 9 is performed (S30), and the operation of switching the vehicle to the 2WD state by stopping the switching to the 4WD state and disconnecting the disconnector 9 when the condition to be switched to the 2WD state is satisfied (S70).

Meanwhile, the operation of maintaining the 4WD state by completing the connection of the disconnector 9 and then maintaining the disconnector 9 in the connected state for the predetermined maintenance time period when the condition to be switched to the 2WD state is not satisfied while the operation of synchronizing the disconnector 9 (S20) is performed (S50) is performed.

After the predetermined maintenance time period has elapsed, the operation of determining whether the condition to be switched to the 2WD state is satisfied (S60) is performed, and according to the result, the vehicle is switched to the 2WD state by disconnecting the disconnector 9 or maintains the 4WD state by maintaining the connected state.

The condition to be switched from the 2WD state to the 4WD state may be determined as being satisfied when the driver selects a 4WD mode, a power mode, or a sports mode, the amount of operation of the accelerator pedal is greater than or equal to the predetermined reference operation amount, the lateral acceleration of the vehicle is greater than or equal to the predetermined reference lateral acceleration, the wheel slip of at least one of the four wheels of the vehicle is greater than or equal to the predetermined reference wheel slip, or the operation of the vehicle posture control device such as the electronic stability control (ESC) or the traction control system (TCS) is performed.

Furthermore, the condition to be switched to the 2WD state may be determined as being satisfied when it is determined that all items for determining the condition to be switched from the 2WD state to the 4WD state are not satisfied.

For reference, since a 4WD mode itself transmits the driver's will to drive the vehicle in the 4WD state to the vehicle, the driver attempts to the switching to the 4WD state according to his or her will when selecting the 4WD mode.

Accordingly, a driving mode in which the condition to be switched from the 2WD state to the 4WD state is satisfied will be regarded as being selected as long as it is the driving mode which causes the vehicle to be substantially operated in the 4WD by the driver's will even when the name of the driving mode selected by the driver is not necessarily the "4WD mode".

Furthermore, because the "power mode" and the "sports mode" are used as representative modes of the driving mode in which the driver requires the vehicle to exert a greater driving force when the driving mode is provided to provide a greater driving force than in the general traveling mode of the vehicle even when the actual names are different, this may be regarded as corresponding to the power mode or the sports mode.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling a disconnector for a vehicle, the method comprising:
   switching, by a controller, the vehicle to a 4WD state by connecting the disconnector;
   maintaining, by the controller, the disconnector in a connected state for a predetermined maintenance time;
   determining, by the controller, whether a condition to be switched to a 2WD state is satisfied when the predetermined maintenance time period elapses; and
   disconnecting, by the controller, the disconnector when the condition to be switched to the 2WD state is satisfied.

2. The method of claim 1,
   wherein the switching of the vehicle to the 4WD state by connecting the disconnector is performed after:
   determining whether a condition to be switched from the 2WD state to the 4WD state is satisfied, and
   synchronizing the disconnector when the condition to be switched to the 4WD state is satisfied.

3. The method of claim 2, further including:
   determining whether the condition to be switched to the 2WD state is satisfied while the synchronizing of the disconnector is performed,
   wherein the switching of the vehicle to the 4WD state by connecting the disconnector when the condition to be switched to the 2WD state is not satisfied while the synchronizing of the disconnector is performed is performed.

4. The method of claim 3,
   wherein the disconnecting of the disconnector when the condition to be switched to the 2WD state is satisfied while the synchronizing of the disconnector is performed is performed.

5. The method of claim 2, further including:
   determining, by the controller, whether the vehicle satisfies the condition to be switched to the 2WD state before the synchronizing of the disconnector is ended,
   wherein when the condition to be switched to the 2WD state is satisfied, the vehicle returns to the 2WD state by ending the switching to the 4WD state and disconnecting the disconnector.

6. The method of claim 2,
   wherein the condition to be switched from the 2WD state to the 4WD state includes at least one combination of a driving mode selection of a driver, an amount of operation of an accelerator pedal, a lateral acceleration of the vehicle, a wheel slip, and a vehicle posture control.

7. The method of claim 6,
   wherein the condition to be switched from the 2WD state to the 4WD state is determined as being satisfied when the amount of operation of the accelerator pedal is greater than or equal to a predetermined reference operation amount.

8. The method of claim 6,
   wherein the condition to be switched from the 2WD state to the 4WD state is determined as being satisfied when the lateral acceleration of the vehicle is greater than or equal to a predetermined reference lateral acceleration.

9. The method of claim 6,
   wherein the condition to be switched from the 2WD state to the 4WD state is determined as being satisfied when the wheel slip of at least one of four wheels of the vehicle is greater than or equal to a predetermined reference wheel slip.

10. The method of claim 6,
    wherein the condition to be switched from the 2WD state to the 4WD state is determined as being satisfied when the vehicle posture control of a vehicle posture control device including an electronic stability control (ESC) or a traction control system (TCS) is performed.

11. A method of controlling a disconnector for a vehicle, the method including:
    determining, by a controller, whether a condition to be switched from a 2WD state to a 4WD state is satisfied;
    synchronizing, by the controller, the disconnector when the condition to be switched to the 4WD state is satisfied;
    determining, by the controller, whether a condition to be switched to the 2WD state is satisfied while the synchronizing of the disconnector is performed; and
    switching, by the controller, the vehicle to the 2WD state by stopping a switching to the 4WD state and disconnecting the disconnector when the condition to be switched to the 2WD state is satisfied.

12. The method of claim 11,
    wherein the condition to be switched from the 2WD state to the 4WD state is determined as being satisfied in a response that:
    the controller receives a selection of a 4WD mode, a power mode, or a sports mode,
    an amount of operation of an accelerator pedal is greater than or equal to a predetermined reference operation amount,
    a lateral acceleration of the vehicle is greater than or equal to a predetermined reference lateral acceleration,
    a wheel slip of at least one of four wheels of the vehicle is greater than or equal to a predetermined reference wheel slip, or
    an operation of a vehicle posture control device including an electronic stability control (ESC) or a traction control system (TCS) is performed.

13. The method of claim 12,
    wherein the condition to be switched to the 2WD state is determined by the controller as being satisfied when the controller concludes that all items for determining the condition to be switched from the 2WD state to the 4WD state are not satisfied.

14. The method of claim 13,
    wherein maintaining the 4WD state by completing a connection of the disconnector and then maintaining the disconnector in a connected state for a predetermined maintenance time period when the condition to be switched to the 2WD state is not satisfied while the synchronizing of the disconnector is performed is performed by the controller.

15. The method of claim 14,
wherein the determining of whether the condition to be switched to the 2WD state is satisfied after the predetermined maintenance time period has elapsed is performed, and
according to a result of the determining of whether the condition to be switched to the 2WD state is satisfied, the disconnector is disconnected or the connected state of the disconnector is maintained by the controller.

16. A vehicle controlling a disconnector for the vehicle, the vehicle comprising:
a motor;
the disconnector provided on a driveshaft connecting a differential and a wheel of the vehicle and configured to selectively connect the motor and the wheel; and
a controller configured to control the disconnector,
wherein the controller is configured for:
determining whether a condition to be switched from a 2WD state to a 4WD state is satisfied;
synchronizing the disconnector when the condition to be switched to the 4WD state is satisfied;
determining whether a condition to be switched to the 2WD state is satisfied while the synchronizing of the disconnector is performed; and
switching the vehicle to the 2WD state by stopping a switching to the 4WD state and disconnecting the disconnector when the condition to be switched to the 2WD state is satisfied.

17. The vehicle of claim 16,
wherein the condition to be switched from the 2WD state to the 4WD state is determined as being satisfied in a response that:

the controller receives a selection of a 4WD mode, a power mode, or a sports mode,
an amount of operation of an accelerator pedal is greater than or equal to a predetermined reference operation amount,
a lateral acceleration of the vehicle is greater than or equal to a predetermined reference lateral acceleration,
a wheel slip of at least one of four wheels of the vehicle is greater than or equal to a predetermined reference wheel slip, or
an operation of a vehicle posture control device including an electronic stability control (ESC) or a traction control system (TCS) is performed.

18. The vehicle of claim 17,
wherein the condition to be switched to the 2WD state is determined by the controller as being satisfied when the controller concludes that the condition to be switched from the 2WD state to the 4WD state is not satisfied.

19. The vehicle of claim 18,
wherein maintaining the 4WD state by completing a connection of the disconnector and then maintaining the disconnector in a connected state for a predetermined maintenance time period when the condition to be switched to the 2WD state is not satisfied while the synchronizing of the disconnector is performed is performed by the controller.

20. The vehicle of claim 19,
wherein the determining of whether the condition to be switched to the 2WD state is satisfied after the predetermined maintenance time period has elapsed is performed, and
according to a result of the determining of whether the condition to be switched to the 2WD state is satisfied, the disconnector is disconnected or the connected state of the disconnector is maintained by the controller.

* * * * *